United States Patent Office 3,354,055
Patented Nov. 21, 1967

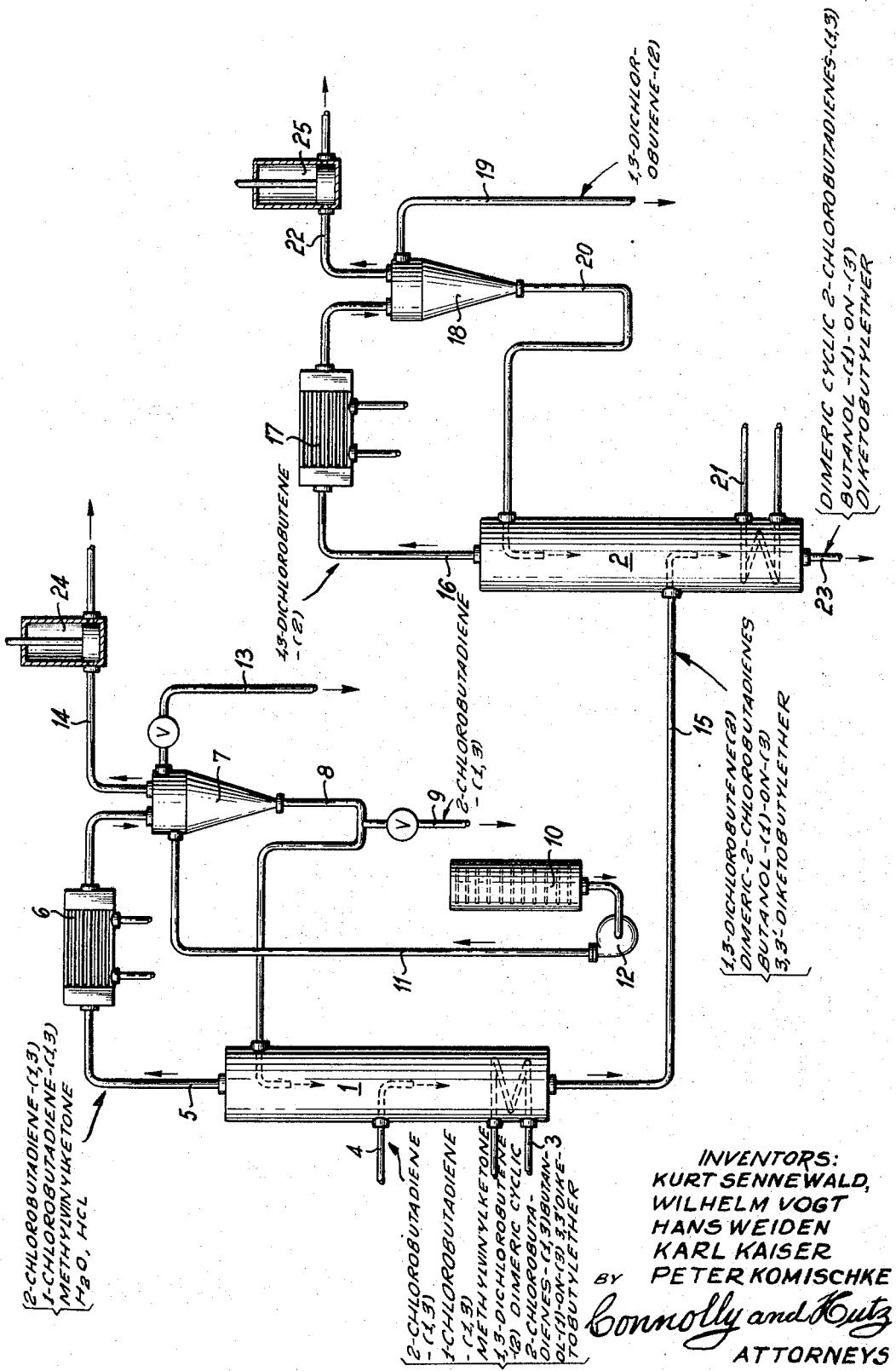

3,354,055
PURIFICATION OF 1,3-DICHLORO-BUTENE-(2) BY PLURAL STAGE VACUUM DISTILLATION
Kurt Sennewald and Wilhelm Vogt, Knapsack, near Cologne, Hans Weiden, Rodenkirchen, near Cologne, Karl Kaiser, Brühl, near Cologne, and Peter Komischke, Efferen, near Cologne, Germany, assignors to Knapsack Aktiengesellschaft, a corporation of Germany
Filed May 6, 1964, Ser. No. 365,393
Claims priority, application Germany, May 15, 1963, K 49,744
6 Claims. (Cl. 203—8)

ABSTRACT OF THE DISCLOSURE

Process for isolating 1,3-dichlorobutene-(2) from a 2-chlorobutadiene-(1,3) production sump comprising 1,3-dichlorobutene-(2); dimeric cyclic 2-chlorobutadienes-(1,3); butanol-(1)-on-(3)-(3); 3,3'-diketobutylether; 1-chlorobutadiene-(1,3); methylvinylketone; 2-chlorobutadiene-(1,3) and water by introducing the sump into a first distillation zone, removing the low boiling constitutents from the top of said zone, conducting the sump from said first distillation zone to a second distillation zone and removing the 1,3-dichlorobutene-(2) from the top of the second distillation zone.

---

The present invention is concerned with a process for isolating and purifying 1,3-dichlorobutene-(2) from a 2-chlorobutadiene-(1,3) production sump, and with an apparatus suitable for use in carrying out this process.

It is known that 2-chlorobutadiene-(1.3) and various by-products, especially 1,3-dichlorobutene-(2) can be obtained by the additive combination of hydrogen chloride with monovinyl acetylene in an aqueous hydrochloric acid cuprous chloride catalyst. 1,3-dichlorobutene-(2) is used as a starting material for making 2,3-dichlorobutadiene-(1,3) which in turn is employed as a comonomer for making copolymers of 2-chlorobutadiene-(1,3).

2 - chlorobutadiene - (1,3) and 1,3-dichlorobutene-(2) can be separated from one another in conventional and simple manner by distillation. On the other hand, German Patent No. 1,114,806 discloses separating 2-chlorobutadiene-(1,3) from its production sump by a process going beyond the limits of customary distillation. Such production sump contains residual 2-chlorobutadiene-(1,3) (boiling point: 59.5° C. under a pressure of 760 mm. mercury); 1-chlorobutadiene-(1,3) (boiling point: 67° C. under a pressure of 760 mm. mercury); methylvinylketone (boiling point: 83° C.); cis- and trans-1,3-dichlorobutene-(2) (boiling point: 125–127° C. under a pressure of 760 mm. mercury); dimeric 2-chlorobutadienes of the type of chlorovinyl-chlorocyclohexene (I) obtained Diels-Alder reaction, vinyldichlorocyclohexene (II), vinylchlorocyclohexadiene (III), dichlorocyclooctadiene (IV) (boiling range: 180–250° C. under a pressure of 760 mm. mercury); and butanol-(1)-on-(3) (boiling point: 73° C. under a pressure of 11 mm. mercury) and 3,3'-diketobutylether (boiling point: 123° C. under a pressure of 10.5 mm. mercury) obtained by the additive combination of water with monovinyl acetylene.

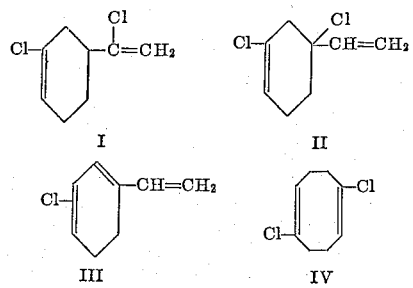

Previously, it has not been possible to obtain satisfactory yields of pure 1,3-dichlorobutene-(2) by separating it by distillation at atmospheric or reduced pressure from such 2-chlorobutadiene-(1,3)-production sump. It was unexpectedly found that such separating process on a laboratory scale, even when carried out discontinuously, results in the splitting off of hydrogen chloride, separation of water and contamination of all fractions by methylvinylketone. The water separated is partially dissolved physically in the sump and partially comes from the phase where butanol-(1)-on-(3) is dehydrated into methylvinylketone. Further, the water and hydrogen chloride as separated products entrain difficult corrosion problems in the condensing systems of the distillation means.

These operative disadvantages are obviously the reason why the isolation of 1,3-dichlorobutene-(2) from a 2-chlorobutadiene-(1,3) production sump has not previously been described in the literature.

The present invention unexpectedly provides a continuous process for isolating and purifying 1,3-dichlorobutene-(2) from a 2-chlorobutadiene-(1,3)-production sump, wherein the splitting off of hydrogen chloride from compounds (I) and (II) with the formation of compound (III), and the hydrogen chloride-catalyzed splitting off of water from butanol-(1)-on-(3) with the formation of methylvinylketone are substantially suppressed. As a result thereof, the 1,3-dichlorobutene-(2) fraction is hardly further contaminated by methylvinylketone, and the noble steel apparatuses are substantially no longer liable to corrsion.

The process of the present invention is carried out in two distillation stages; the first distillation stage should be operated at a temperature of 105–115° C., preferably 108–110° C. in its sump or bottom portion, at a temperature of 40–50° C., preferably about 45° C. in its top portion and under a pressure of 200–300 mm., preferably about 250 mm., mercury; the second distillation stage should be operated at a temperature of 150–155° C., preferably 152–154° C. in its bottom portion, at a temperature of 61–65° C., preferably 62–63° C. in its top portion, and under a pressure of 60–80 mm., preferably 70 mm. mercury.

Under the operational conditions used in the second distilling stage, 3–6, preferably 3,5–4.5, parts by weight 1,3-dichlorobutene-(2) are allowed to remain in the bottom portion thereof, so that sump temperatures of 152–154° C. are ensured. A sump product free from dichlorobutene would be viscous and would obstruct the sump outlet openings.

The process of this invention obviates the separation of a water-methylvinylketone mixture from 1,3-dichlorobutene-(2), the deacidification and drying which are usually necessary subsequent to customary distillation methods.

According to a further embodiment of the present invention, stabilizers are added so as to avoid polymerization of the 2-chlorobutadiene-(1,3) obtained as the head product of the first distilling stage together with 2–40, preferably 10–15, parts by weight 1-chlorobutadiene-(1,3) and 2–50, preferably 10–20, parts by weight methylvinylketone.

More particularly, the present invention is concerned with a continuous process for isolating and purifying 1,3-dichlorobutene-(2), wherein a 2-chlorobutadiene-(1,3)-production sump consisting essentially of 1,3-dichlorobutene-(2), dimeric cyclic 2-chlorobutadienes-(1,3), butanol-(1)-on-(3), 3,3'-diketobutylether, 1-chlorobutadiene-(1,3), methylvinylketone, residual 2-chlorobutadiene-(1,3), and water, is introduced into a heated first distilling stage, operated under a pressure of 200–300 mm. mercury, in which a mixture consisting of residual 2-chlorobutadiene-(1,3), 1-chlorobutadiene-(1,3), methylvinylketone, water, hydrogen chloride and some 1,3-dichlorobutene-(2) is withdrawn at about 40–50° C. at the top portion of said first distilling stage to leave a sump product therein, the sump product is introduced into a second heated distilling stage, operated under a pressure of about 60–80 mm. mercury, in which 1,3-dichlorobutene-(2) slightly contaminated with 1- and 2-chlorobutadiene-(1,3) and methylvinylketone is withdrawn at about 61–65° C. at the top portion of said second distilling stage so as to leave dimeric cyclic 2-chlorobutadienes-(1,3), butanol-(1)-on-(3), 3,3'-diketobutylether and small amounts of 1,3-dichlorobutene-(2) in the sump portion of said second distilling stage.

The distilling stages are advantageously columns packed with saddle-shaped filling material. The products withdrawn at the top portions of the distilling stages are first condensed and then preferably partially refluxed as a reflux liquid into the respective distilling stage. After condensation, the product obtained at the top portion of the first distilling stage is freed from its aqueous phase, and the condensate is admixed with a solution of about 1 part by weight phenothiazine, 15 parts by weight N-nitrosodiphenylamine and 84 parts by weight condensate so as to prevent polymerization. The reflux liquid of the first distilling stage should contain, per thousand parts, about 0.05–1 part by weight N-nitrosodiphenylamine and about 0.01 to 1 part by weight phenothiazine.

The following example illustrates the process of the present invention with reference to the accompanying flow scheme.

Example

The distilling means consisted substantially of two distilling columns 1 and 2, the allotted condensing systems, and vacuum pumps 24 and 25. The 2-chlorobutadiene-(1,3)-production sump, supplied to about the center portion of column 1 through supply line 4, consisted of 5–15 parts by weight residual 2-chlorobutadiene-(1,3), 0.5–5 parts by weight 1-chlorobutadiene-(1,3), 1–5 parts by weight methylvinylketone, 50–56 parts by weight 1,3-dichlorobutene-(2) and 30–35 parts by weight dimeric cyclic 2-chlorobutadienes-(1,3), butanol-(1)-on-(3) and 3,3'-diketobutylether. First distilling column 1, which was packed with saddle-shaped filling material, was maintained under a pressure of 250 mm. mercury, produced by vacuum pump 24, at a temperature of 109° C. in the sump portion, produced by heating means 3, and of 45° C. in the top portion, and a mixture consisting of the low-boiling constituents of the production sump was distilled off at the top portion of distilling column 1. This mixture (10% of the feed mixture to column 1) contained 60–70 parts by weight residual 2-chlorobutadiene-(1,3), 10–15 parts by weight 1-chlorobutadiene-(1,3), 10–20 parts by weight methylvinylketone, 0.1–2 parts by weight water, some hydrogen chloride and 0–10 parts by weight 1,3-dichlorobutene-(2), and travelled through discharge line 5 with the allotted brine-charged cooler 6 into receiver 7, from where a portion was refluxed through line 8 to column 1, while the balance was removed through line 9 to work up 2-chlorobutadiene-(1,3). Receiver 7 was connected through line 14 with vacuum pump 24 and provided with conduit 13 for the discontinuous discharge of the aqueous phase and with supply line 11. With the help of dosing pump 12 and through supply line 11 the condensate of column 1 was so stabilized with a polymerization inhibitor solution coming from storage tank 10 and consisting of 1 part by weight phenothiazine, 15 parts by weight N-nitrosodiphenylamine and 84 parts by weight reflux mixture that the reflux liquid contained, per thousand parts, 0.3–0.5 part by weight N-nitrosodiphenylamine and 0.02–0.03 part by weight phenothiazine.

The sump product of column 1 (90% of the feed to column 1) consisted of about 0–0.2 part by weight 2-chlorobutadiene-(1,3) and 1-chlorobutadiene-(1,3), 0–0.1 part by weight methylvinylketone, 55–65 parts by weight 1,3-dichlorobutene-(2) and 33–45 parts by weight dimeric 2-chlorobutadienes, butanol-(1)-on-(3) and 3,3'-diketobutylether. The mixture flowed through bottom discharge line 15 into approximately the lower third of the second distilling column 2 likewise packed with saddle-shaped filling material, which was maintained under a pressure of 70 mm. mercury with the aid of vacuum pump 25 and suction line 22. 1,3-dichlorobutene-(2), contaminated with about 0.2–0.4 part by weight 1- and 2-chlorobutadiene-(1,3) and methylvinylketone was distilled off at the top portion of distilling column 2 at a temperature of 62–63° C. through top line 16 with the allotted condenser 17 and introduced into receiver 18, from where a portion was refluxed through line 20 to column 2, while the balance thereof was discharged as pure product through discharge line 19. The high boiling dimeric cyclic 2-chlorobutadienes-(1,3), butanol-(1)-on-(3) and diketobutylether (about 96 parts by weight) contained in the 2-chlorobutadiene-(1,3) production sump and 4 parts by weight 1,3-dichlorobutene-(2) were obtained in the sump portion of column 2. They were distilled off at a temperature of 153° C. produced with heater 21 and removed through line 23.

What is claimed is:

1. A continuous process for isolating and purifying 1,3-dichlorobutene-(2) which comprises introducing the high boiling fraction from a 2-chlorobutadiene-(1,3) purification process consisting essentially of 1,3-dichlorobutene-(2), dimeric cyclic 2-chlorobutadienes-(1,3), butanol-(1)-on-(3), 3,3'-diketobutylether, 1-chlorobutadiene-(1,3), methylvinylketone, residual 2-chlorobutadiene-(1,3) and water into a first heated distilling stage operated under a pressure within the range of about 200 to 300 mm. mercury; removing at the top portion of said first distilling stage at a temperature of about 40–50° C. a mixture consisting of residual 2-chlorobutadiene-(1,3), 1-chlorobutadiene-(1,3), methylvinylketone, water, hydrogen chloride and a small proportion of 1,3-dichlorobutene-(2); introducing the product obtained in the lower portion of said first distilling stage into a second heated distilling stage operated under a pressure within the range of about 60 to 80 mm. mercury; removing at the top portion of said second distilling stage at a temperature of about 61–65° C. 1,3-dichlorobutene-(2) slightly contaminated with 1-chlorobutadiene-(1,3), 2-chlorobutadiene-(1,3) and methylvinylketone; and allowing dimeric cyclic 2-chlorobutadienes-(1,3), butanol-(1)-on-(3), 3,3'-diketobnutylether and small proportions of 1,3-dichlorobutene-(2) to collect in the lower portion of said second distilling stage.

2. A process as claimed in claim 1, wherein the distilling stages are distilling columns charged with saddle-shaped packing material.

3. A process as claimed in claim 1, wherein the products removed at the top portions of the distilling stages are condensed and thereafter partially refluxed as a reflux liquid into the respective distilling stage.

4. A process as claimed in claim 1, wherein the product withdrawn at the top portion of the first distilling stage is condensed thereby forming an organic and an aqueous phase and thereafter freed from its aqueous phase.

5. A process as claimed in claim 4, wherein a solution consisting of about 1 part by weight phenothiazine, 15 parts by weight N-nitrosodiphenylamine and 84 parts by weight condensed product is added in measured quantities to the condensed product so as to avoid polymerization thereof.

6. A process as claimed in claim 1, wherein the reflux liquid coming from the first distilling stage contains, per thousand parts, about 0.05 to 1 part by weight N-nitrosodiphenylamine and about 0.1 to 1 part by weight phenothiazine.

References Cited
UNITED STATES PATENTS

| | | | |
|---|---|---|---|
| 2,948,760 | 9/1960 | Capp et al. | 260—654 |
| 2,979,542 | 4/1961 | Bellringer et al. | 260—654 |
| 2,984,690 | 5/1961 | Sennewald et al. | 260—655 |
| 3,015,677 | 1/1962 | Vogt et al. | 260—652.5 |
| 3,275,531 | 9/1966 | Sennewald et al. | 203—8 |

WILBUR L. BASCOMB, JR, *Primary Examiner.*

UNITED STATES PATENT OFFICE

CERTIFICATE OF CORRECTION

Patent No. 3,354,055                                November 21, 1967

Kurt Sennewald et al.

It is certified that error appears in the above identified patent and that said Letters Patent are hereby corrected as shown below:

Column 6, line 3, "about 0.1" should read -- about 0.01 --.

Signed and sealed this 23rd day of September 1969.

(SEAL)
Attest:

Edward M. Fletcher, Jr.                       WILLIAM E. SCHUYLER, JR.
Attesting Officer                                      Commissioner of Patents